United States Patent
Gomyo et al.

[11] Patent Number: 5,930,772
[45] Date of Patent: Jul. 27, 1999

[54] VOLUME-DEPENDENT ACCOUNTING SYSTEM AND METHOD IN CONNECTIONLESS COMMUNICATIONS

[75] Inventors: Hisayuki Gomyo; Hiroshi Horiguchi; Junichi Hattori; Hiroaki Kato; Kentaro Fujiwara, all of Tokyo, Japan

[73] Assignee: Fujitsu Limited, Kawasaki, Japan

[21] Appl. No.: 08/777,660

[22] Filed: Dec. 31, 1996

[30] Foreign Application Priority Data

Mar. 29, 1996 [JP] Japan .................................. 8-076295

[51] Int. Cl.[6] ...................................................... G06F 17/00
[52] U.S. Cl. .................................. 705/30; 705/18; 707/9; 707/10
[58] Field of Search ........................... 705/18, 30; 707/1, 707/9, 10, 102, 205; 395/200.33, 200.47, 200.49, 200.61

[56] References Cited

U.S. PATENT DOCUMENTS 5,608,874  3/1997  Ogawa et al. ...................... 395/200.15

*Primary Examiner*—Thomas R. Peeso
*Attorney, Agent, or Firm*—Staas & Halsey

[57] ABSTRACT

When an accounting process is performed through connectionless communications such as a WWW, etc., a retrieval CGI stores a retrieval result in a file having a file name generated from a process ID and a user ID. Then, a retrieving/accounting process is performed in units of a user ID and a process ID. A session is managed using the process ID as information to be exchanged, thereby requiring no resident combinational software. Furthermore, a volume-dependent accounting can be realized even when communications are disconnected.

25 Claims, 14 Drawing Sheets

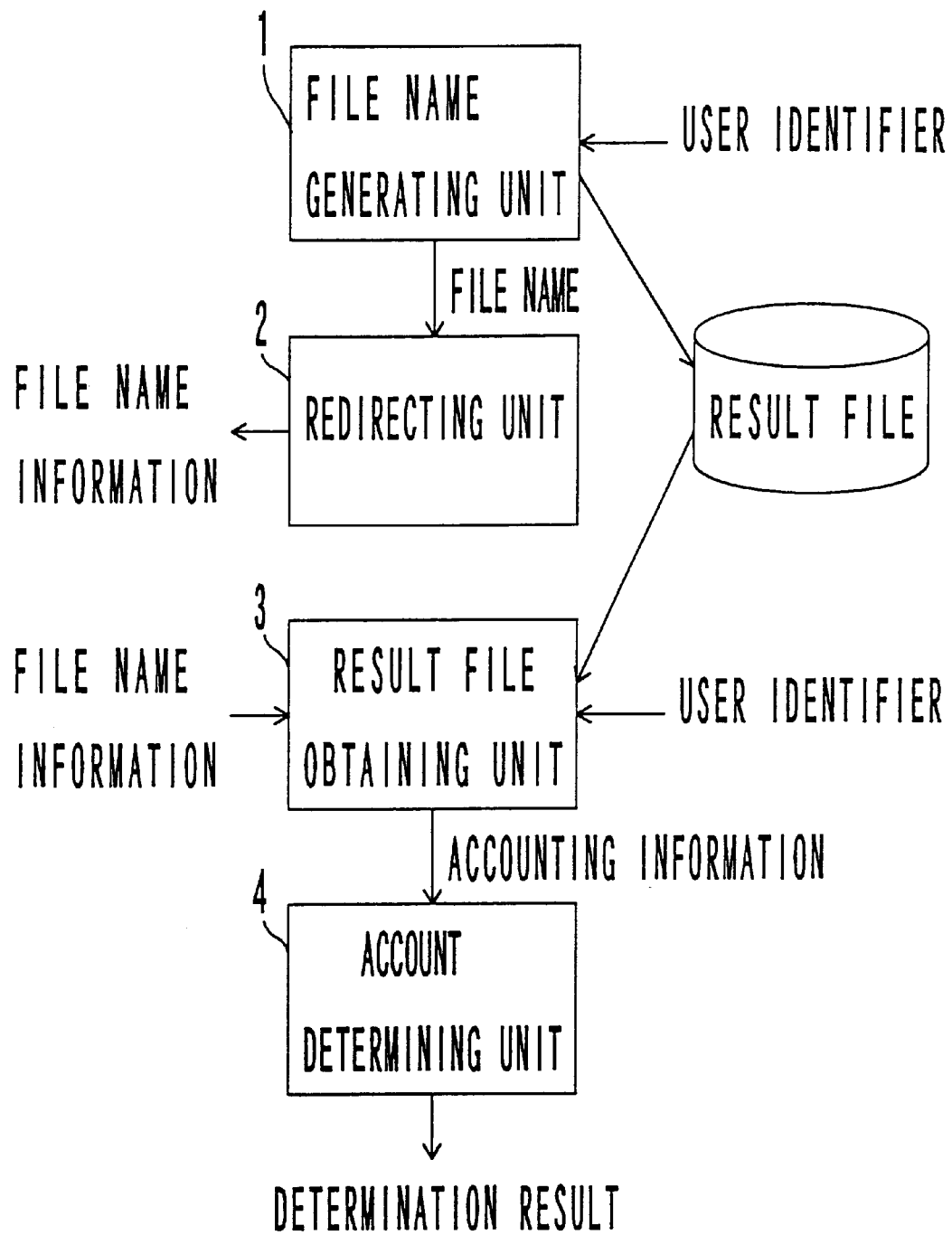
F I G. 1

```
◁  ▷  Reload  ─ 30
```

URL: https://somehost/cgi-bin/db_top

COMPANY INFORMATION DATABASE

INPUT OF RETRIEVAL CONDITIONS

- ● RETRIEVAL COMPANY NAME
  ENTER COMPANY NAME.

[ ■■■ ]    [✓] FORWARD MATCHING

- ○ RETRIEVAL OF COMPANY REPRESENTATIVE PHONE NUMBER
  ENTER COMPANY REPRESENTATIVE PHONE NUMBER.

[          ]

- ○ RETRIEVAL OF COMPANY NUMBER
  ENTER COMPANY NUMBER.

[          ]

31 ─ [START OF RETRIEVAL]   [CANCEL] ─ 32

RETURN TO HomePage
CONTACT G-Search FOR FURTHER INFORMATION.
e-mail:www@gsh.co.jp
tel:03-5442-4395

F I G.  5

USER ID, PROCESS ID, list.html

EMBEDDED IN URL OF OUTPUT CGI

```
◁  ▷  [Reload] ─ 30

URL: https://somehost/cgi-bin/chrgchk?scene=search&next=https%3a%2f%2f~

ACCOUNTING CONFIRMATION SCREEN

ACCOUNTING PROCESS IS PERFORMED AT DB.
(OPTIONALLY SELECT ONE OF FOLLOWING ITEMS TO DETERMINE
WHETHER OR NOT THIS SCREEN CONTINUES HEREAFTER.)

33 ─● THIS SCREEN CONTINUES TO BE OUTPUT HEREAFTER.
   ○ THIS SCREEN DOES NOT CONTINUE TO BE OUTPUT ANY MORE.
34

[CONTINUE] ─ 35

RETURN TO HomePage
CONTACT G-Search FOR FURTHER INFORMATION.
e-mail:www@gsh.co.jp
tel:03-5442-4395
```

F I G.  7

```
┌─────────────────────────────────────────────────────────────┐
│  ◁   ▷   Reload ─30        PROCESS ID                       │
│                                   │                         │
│ URL: https://somehost/cgi-bin/db_out?file=1230.list.html&cntr=100&page= ~│
│─────────────────────────────────────────────────────────────│
│ COMPANY INFORMATION    RETRIEVAL RESULT                     │
│ DATABASE               OF COMPANY LIST                      │
│─────────────────────────────────────────────────────────────│
│                                                             │
│ OUTLINE OF COMPANY IS DISPLAYED                             │
│ BY CLICKING BUTTON ON EACH COMPANY NAME.                    │
│                                                             │
│ COMPANY NAME       ADDRESS              TYPE OF BUSINESS    │
│ ■■■COMPANY     □□□□□□□□□□-□-□     □□□□□□□□□□         │
│ ■■■COMPANY     □□□□□□□□□□□□□       □□□□□□□□□□         │
│ COMPANY■■■     □□□□□□□□□□-□-□     □□□□□□□□□□         │
│ ■■■COMPANY     □□□□□□□□□□□□□       □□□□□□□□□□         │
│ COMPANY■■■     □□□□□□□□□-□□-□     □□□□□□□□□□         │
│ ■■■COMPANY     □□□□□□□□□□□□□       □□□□□□□□□□         │
│─────────────────────────────────────────────────────────────│
│ RE-RETRIEVAL  |  G-Search Top Menu  |  ACCOUNTING CONFIRMATION:ON │
│─────────────────────────────────────────────────────────────│
│ RETURN TO HomePage                                          │
│ CONTACT G-Search FOR FURTHER INFORMATION.                   │
│ e-mail:www@gsh.co.jp                                        │
│ tel:03-5442-4395                                            │
└─────────────────────────────────────────────────────────────┘
```

F I G. 8

◁ ▷ [Reload] ~30    PROCESS ID

URL: https://somehost/cgi-bin/db_out?file=1230.4567800.sum.html&cntr=10 ~

COMPANY INFORMATION DATABASE    OUTLINE OF COMPANY

■■■ COMPANY

《 COMPANY NAME 》    ■■■ COMPANY
《 PHONE NUMBER 》    xx-xxxx-xxxx
《 ADDRESS 》    〒xxx ☐☐☐☐☐☐☐☐☐☐-☐-☐
《 FOUNDATION 》    xx/xx/19xx
《 CAPITAL 》    xxx,xxx,xxx,xxx YEN
《 NUMBER OF
    EMPLOYEES 》    xx,xxx
《 STOCK 》    ENTERED IN STOCK MARKET
《 RELATED TO 》    ☐☐☐☐
《 CLIENT 》    ☐☐☐☐

《REPRESENTATIVE》    ☐☐☐☐
《 PHONE NUMBER 》    xxx-xxx-xxxx
《 ADDRESS 》    〒xxx ☐☐☐☐☐☐☐☐☐☐-☐-☐
《GRADUATE FROM 》    ☐☐☐☐

RE-RETRIEVAL | G-Search Top Menu | LIST | ACCOUNTING CONFIRMATION:ON

RETURN TO HomePage
CONTACT G-Search FOR FURTHER INFORMATION.
e-mail:www@gsh.co.jp
tel:03-5442-4395

F I G. 9

VOLUME-DEPENDENT ACCOUNTING SYSTEM AND METHOD IN CONNECTIONLESS COMMUNICATIONS

BACKGROUND OF THE INVENTION

1. Field of the Invention

The present invention relates to a volume-dependent accounting system and method for managing a session between a client and server and performing an accounting process at a request of a user in a service through connectionless communications such as a World Wide Web (WWW).

2. Description of the Related Art

Recently, various networks connected through the Internet and the server computers in the networks realize information groups referred to as WWW. In a WWW, a service-requesting client computer is provided with software referred to as a browser for communicating with the server.

When the browser requests the server to provide a service such as retrieval of data from a database in such a WWW, there is the problem that a session should be properly managed. A session refers to the communication established between the users recognized when the communication is set.

Normally, since the hyper text transfer protocol (HTTP) used by the browser is a connectionless protocol, the session is set when the browser requests a page and terminates when the server transmits the page. Therefore, when the client accesses another screen, another session is set with the relation to the previous communication unsaved.

As a result, various problems arise when the WWW is used with a database. Normally, a database server can consecutively perform a plurality of processes once a client logs in. However, when data is to be retrieved using a combination of a WWW and a database, a process cannot be successfully performed if the communications between the client and server cannot be completed with one question and answer. For example, if a process continues from the previous page as in a converging retrieval, it is recognized as another session.

Therefore, when the sessions are managed in such a combinational system, resident combined software can be incorporated in addition to a non-resident common gateway interface (CGI) program to recognize a session established covering a plurality of screens. A session continues if the combined software confirms a session identifier transmitted from the browser.

However, the above described WWW has the following problem.

Incorporating a combined software into a server to manage a session covering a plurality of screens does not guarantee the next access by the browser of the session. Therefore, there arises the problem that the combined software indefinitely repeats checking of the identifier. Thus, the resident combined software should be developed in consideration of various conditions.

When a service for a client includes information using a WWW server, the server should correctly charge the user for a service in addition to the problem of the session management. The accounting system can normally be a fixed-amount system or a volume-dependent system.

In the fixed-amount system, a fixed fee is charged to a user's account for each period as long as a user to be charged can be identified. Therefore, this system is relatively easy to realize. On the other hand, the volume-dependent system has quite a few problems.

A basic volume-dependent system is based on the time of access obtained from the access log of the server. However, communications are often disconnected on the network, and the user may not be able to obtain the transmitted contents. Therefore, correctly recording an "access" into the log does not indicate that the requested information has been successfully transmitted to the user.

The data transmission may be either intentionally interrupted by the user or accidentally interrupted through a problem in the network. The former case is normally referred to as an 'interrupt'.

The user's intentional interrupt indicates the state in which the transmission of data is suspended by the user by, for example, clicking a mouse button, that is, a pointing device such as a mouse, on the stop button (read stop button) on the display screen of the browser. A problem in the network indicates a state in which data have been lost due to, for example, network overload.

Thus, in the volume-dependent accounting system, it is required that a user is not charged for a suspension of data transmission and that the accounting timing should be clearly defined to provide a user-friendly man-machine interface (MMI). At present, one user identifier is often shared among a plurality of users, and an appropriate mechanism is required to charge a user for a service after correctly recognizing who, of the users having the same user identifier, has accessed data.

SUMMARY OF THE INVENTION

The present invention aims at providing an accounting system and method for managing a session between a client and server and performing a reasonable and correct volume-dependent accounting process in a service through connectionless communications.

The accounting system according to the present invention is used in an information processing apparatus for providing a service through connectionless communications, and comprises a file name generating unit, a redirecting unit, a result file obtaining unit, and an account determining unit.

The file name generating unit generates the file name of a result file storing the process results to be provided for clients based on the user identifier and process identifier. The user identifier identifies the client or user and is obtained from the client when he or she requests a service. The process identifier is generated based on the information from the OS when the client requests the service.

The redirecting unit outputs file name information relating to the file name of the above described result file to the above described client to allow the client to access the information using the file name information.

The result file obtaining unit generates the file name from the file name information and user identifier, and obtains the accounting information in the above described result file.

The account determining unit determines whether or not the user is charged for the information according to the above described accounting information, and outputs the determination result.

If the accounting information indicates 'not charged', the account determining unit determines to charge the user for the service and alters the accounting information in the result file into 'charged'. If the accounting information indicates 'charged', then the account determining unit determines that the user has already been charged.

The system further comprises an accounting unit for receiving the determination result from the account determining unit and charging the user for the service using each user identifier according to the determination result.

The system also comprises an account confirming unit for displaying for the client the account confirmation screen on which the system obtains user's acceptance of the charge for the service when access involves the above described file name information.

The system further comprises a file deleting unit for deleting the above described result file after a predetermined time.

It also comprises a fee display unit for outputting the contents of the fee display file storing a charged amount when the account determining unit determines that the user should be charged for the service.

It further comprises a retrieving unit for storing the retrieval result in the above described result file after searching a database at a request from the client.

Since the process result provided for the client is stored in the above described result file and the file name of the result file is generated by the file name generating unit based on the user identifier and process identifier according to the accounting system of the present invention, the process result is managed using the user identifier and process identifier.

When the file name is generated, a session is managed by using the process identifier obtained when the client requests a service and by using the information based on the file name as information to be exchanged between the system and the client. Thus, the combined software does not have to be resident. Even if the communications are disconnected, a substitute volume-dependent accounting system can be realized.

BRIEF DESCRIPTION OF THE DRAWINGS

FIG. 1 shows the principle of the present invention;

FIG. 5 shows the retrieval condition input screen;

FIG. 7 shows the accounting confirmation screen;

FIG. 8 shows the first retrieval result output screen;

FIG. 9 shows the second retrieval result output screen;

DESCRIPTION OF THE PREFERRED EMBODIMENTS

Figure 2:
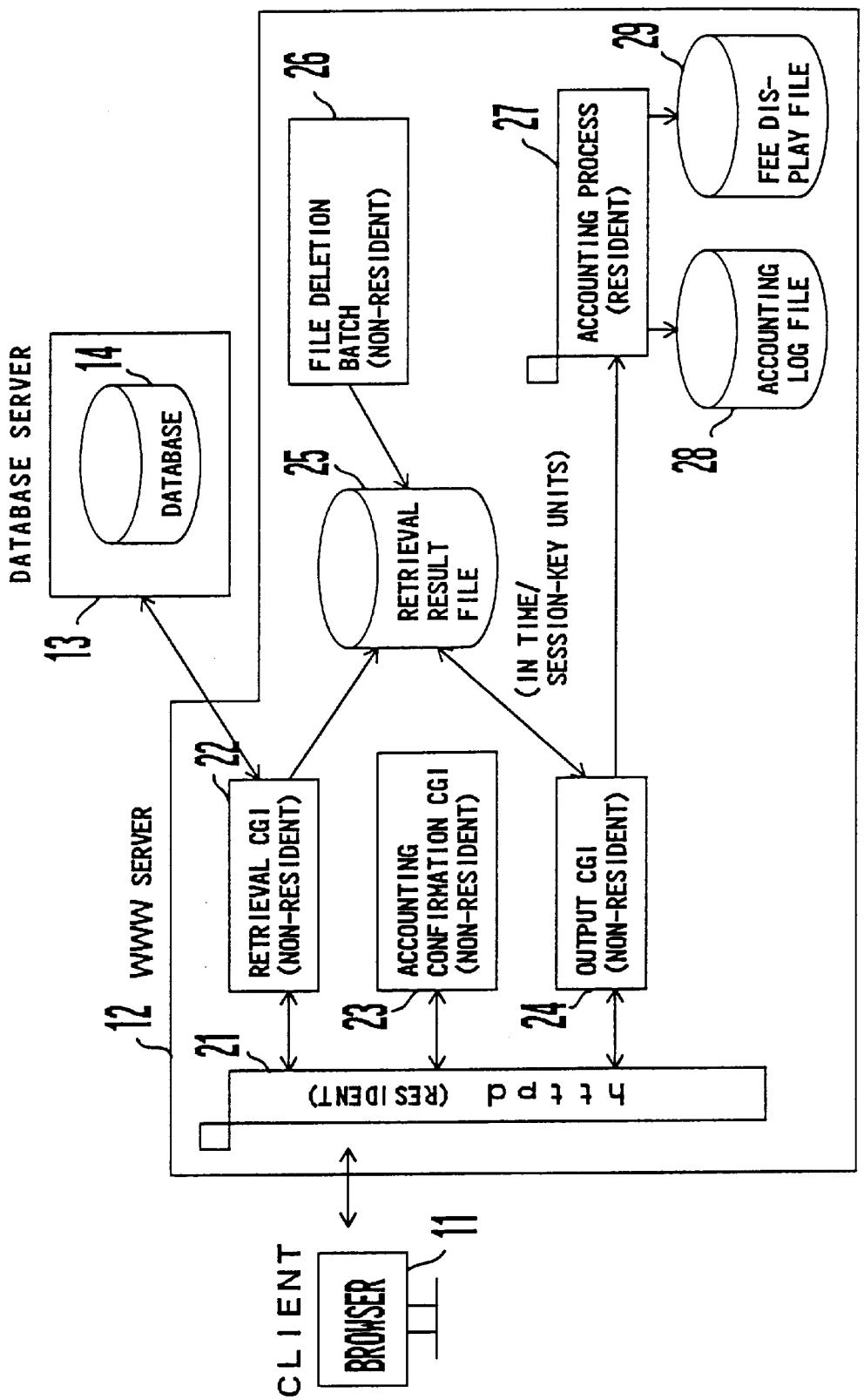
FIG. 2 shows the configuration of the accounting system according to the embodiment of the present invention.

FIG. 1 shows the principle of the accounting system of the present invention. The accounting system shown in FIG. 1 is provided in the server system for providing a service, and comprises a file name generating unit 1, a redirecting unit 2, a result file obtaining unit 3, and an account determining unit 4.

The file name generating unit 1 generates, based on a user identifier, a file name of a result file storing a process result provided for the client.

The redirecting unit 2 outputs the file name information relating to the above described file name to the client, and allows the client who uses the file name information to access the requested data.

The result file obtaining unit 3 generates the above described file name from the file name information and user identifier received from the client, and obtains the accounting information from the result file.

The account determining unit 4 determines according to the above described accounting information whether or not the user is to be charged for a service, and outputs a determination result.

The file name generated by the file name generating unit 1 contains the information about the user identifier, and the process results obtained by the server at a service request from a client system are managed for each user identifier. The redirecting unit 2 generates from the file name the file name information required to specify the file name, and transmits it to the client. The file name information can be a file name with the user identifier masked.

Even if the communications are disconnected after the redirecting unit 2 has transmitted the file name information, the client is allowed to again access the result file in the server using the file name information. Since it is determined that the access involving the file name information belongs to the same session as the access which first requested a service, the session can be managed using this information.

Therefore, it is not necessary for a combined software for managing the session identifier to be resident at a server, and a session can be recognized in a non-resident process such as a CGI even if it appears on two screens.

The result file obtaining unit 3 generates in a predetermined method a file name of a result file from the user identifier and file name information associated with the access from the client involving the file name information. Using the file name, the process result stored in the result file is obtained and transmitted to the client.

Furthermore, the result file stores accounting information indicating whether or not users have been charged for services. The result file obtaining unit 3 obtains the information and transmits it to the account determining unit 4. The account determining unit 4 determines that the user has already been charged when the accounting information indicates 'charged', and determines that the user has not been charged when the accounting information indicates 'not charged'. Based on this determination, the account determining unit 4 outputs a determination result.

When a user is charged for a service for each user identifier according to the determination result, the user is charged for only the first access to the result file and is not charged for the second and subsequent access. Therefore, the service requesting user is charged only for one access to the data even if the user repeatedly reloads the process result, as long as the result file is not deleted. Thus, the volume-dependent accounting system can be realized to charge a user for each session covering a plurality of communications in the connectionless communications.

Since the file name information is generated for each session for temporary use and privately exchanged, a correct file name of the result file cannot be regenerated even if another user accesses the data using the user identifier in the file name, thereby preventing another user from obtaining the process result. In this case, a new request for a service may be issued to request a process with a charge.

Thus, according to the accounting system of the present invention, a reasonable and proper volume-dependent accounting system for both user and service provider can be realized.

For example, the function of the file name generating unit 1 shown in FIG. 1 corresponds to the function of a retrieval CGI 22 shown in FIG. 2. The function of the redirecting unit 2 corresponds to the function of the retrieval CGI 22 or an accounting confirmation CGI 23. The functions of the result file obtaining unit 3 and account determining unit 4 correspond to the function of, for example, an output CGI 24. Each of these units can be realized by the central processing unit (CPU) and memory (not shown in FIG. 2) in a WWW server 12.

The embodiments of the present invention are described in detail by referring to the attached drawings.

For example, in commercializing a WWW-type database with which a database retrieval service is provided, the conditions of operating the complete process-amount-dependent accounting system are listed below.

(1) A no-charge process is performed when users reload data or data transmission is suspended. 'Reload' indicates that a user specifies reloading of a detection result. 'Suspension of data transmission' indicates that the communications have been disconnected by, for example, errors in the network.

(2) The timing for the accounting process is clarified to realize a user-friendly MMI.

(3) A no-charge time is set for repeated access to the same screen. For example, it should be clearly expressed that a user is not charged for reloading data within one hour.

(4) User's convenience should be considered by displaying the fees for accesses made in at least the last 2 weeks.

(5) A system should be designed to serve a large number of users. In this case, user access includes plural times of access using the same user identifier (including a double log-in, etc).

In the accounting system according to the present invention, the above described volume-dependent accounting system is realized while using the redirect function of the HTTP by allowing a non-resident process CGI to be provided with the session management function. 'Redirect' refers to an operation of altering, a request from a server triggering it, through a browser, a uniform resource locator (URL) which is address information of accessed data, thereby gaining new access.

Since the CGI is not resident, it holds no information about past accesses of the browser, and cannot recognize a session as is. Therefore, a file name of the detection file storing retrieval results is generated based on the user identifier (user ID) and process identifier (process ID) obtained at the first access. The file stores the contents obtained from the database.

This accounting system is based on membership, and a user ID is assigned to each member. The user ID is obtained at each access using the basic authenticating function fundamentally provided for a standard WWW server. Therefore, the same user ID can be obtained for different CGIs as long as the access is gained in the same session.

The process ID is an identifier such as the one in UNIX issued by the OS to manage each process at the activation of the process, or one generated based on the identifier. The retrieval CGI 22 activated by httpd 21 obtains its own identifier from the OS, for example, using the function provided from the OS. The retrieval CGI 22 generates a process ID by setting the identifier as a process ID, or processing the identifier as necessary. Since the process identifiers issued by the OS are, for example in UNIX, the numbers assigned in the order in which they are generated, it is very difficult to estimate the process ID of the present embodiment based on the identifiers. Therefore, it is impossible for a third party to successfully guess the identifier.

The process ID is information exchanged during the communications in the same session. When the server redirects control to another CGI, the process ID is added to its URL and transmitted to the browser. The CGI activated by the browser through the redirection generates the file name based on the transmitted process ID and the user ID obtained by the basic authentication, and accesses the retrieval result file. The retrieval result file stores the accounting information indicating whether or not a user has been charged for a service.

When a retrieval result is transmitted to the browser, the accounting system is designed such that a user is charged for access with a fee for only one accessing operation, with a case where the data may not be transmitted taken into account, even if the user accesses a specific retrieval result file many times within a predetermined period.

In such communications, the process ID at the start of a session is associated with the file name in the server and used as a session key, thereby easily managing sessions without any resident program. Within a predetermined period, data can be retransmitted without charge when the transmission of desired data is suspended due to a reload or transmission of data.

Thus, the retrieving and accounting processes through the present accounting system are performed using a set of a user ID and a process ID. Thus, when a plurality of users retrieve data using the same user ID (double log-in), the same user ID is used with different process IDs of activated retrieval CGIs. Therefore, the sessions are regarded as different from each other and separate retrieving and accounting processes are performed.

Since different process IDs are assigned to the sessions newly started using the same user ID after the above described predetermined period, the sessions are recognized as being different even if they are processed under the same retrieval conditions. Even if a third party obtains and uses a process ID, by managing the retrieving/accounting process using a set of a process ID and a user ID and transmitting only the process ID as session communications information, retrieval result data cannot be accessed because user IDs are individual. Therefore, users can be charged for each session, and a volume-dependent accounting process can be realized for commercial use.

The accounting system according to the present invention activates a specific CGI before performing an accounting process, and displays a confirmation screen on which a user determines for each accounting case whether or not the user is chargeable. Thus, the accounting timing is made clear to the user, and the user can refuse the accounting. As a result, users can accept the accounting service without concern.

Furthermore, users can confirm an accounting history by preparing a file through which utilization and fee for a past predetermined period are displayed. Therefore, troubles regarding the payment of fees can be reduced, and the system can be easily used by both users and service providers.

FIG. 2 shows the configuration of the database retrieving system into which the accounting system according to the present invention is incorporated. In FIG. 2, the database retrieving system comprises the WWW server 12 and a database server 13. The WWW server 12 communicates with the WWW browser in a client 11 and the database server 13 through the network, instructs the database server 13 to retrieve data, performs an accounting process, etc.

The client 11 and WWW server 12 have computer systems each comprising a CPU, memory, a network connecting device, etc. not shown in FIG. 2.

The WWW server 12 comprises a hyper text transfer protocol daemon (httpd) 21 and the accounting process 27 which are processes resident in the memory, and non-resident processes, that is, the retrieval CGI 22, accounting confirmation CGI 23, output CGI 24, and a file deletion batch 26. At a request from the browser, the httpd 21 activates the necessary CGI based on the HTTP to transmit data between the browser and the CGI.

Upon receipt of a retrieval request from the browser, the retrieval CGI 22 obtains transmitted retrieval conditions, requests the database server 13 to retrieve data, and receives the result of the retrieval. It generates a file name of a retrieval result file 25 using the user ID and process ID obtained at the time of activation as a session key.

The database server 13 retrieves data from a database 14 under given conditions and returns the retrieval result to the retrieval CGI 22. The retrieval result is stored in the retrieval result file 25. Thus, the retrieval results are stored as individual retrieval result files 25 in the order in which they are generated or based on session keys. In the retrieval result file 25, an accounting flag indicating whether or not an accounting process has been performed on the session is set, and the amount is set as 'not charged' until the retrieval result is obtained.

Next, the retrieval CGI 22 redirects the retrieval result file name to the accounting confirmation CGI 23 as information to be exchanged. Thus, the process of the retrieval CGI 22 terminates, and the browser requests the httpd 21 to newly activate the accounting confirmation CGI 23.

The accounting confirmation CGI 23 outputs an accounting confirmation screen to the client 11 to confirm the accountability through the user. When it is confirmed that the user should be charged for the requested information, the retrieval result file name provided by the browser is set as information to be exchanged, and directed to the output CGI 24.

The output CGI 24 reads the retrieval result file 25, and outputs its contents to the browser after converting them into a hyper text markup language (HTML) format. If the access is gained for the first time to the retrieval result file 25, then the output CGI 24 requests the accounting process 27 to perform the accounting process, and sets the accounting flag in the retrieval result file 25 as 'charged'.

If the user requests to reload the retrieval result, then the output CGI 24 is activated again, the retrieval result file 25 is accessed, and the contents are re-transmitted. If the access is gained to the retrieval result file 25 for the second or subsequent time, the accounting flag indicates 'charged' and no request to perform an accounting process is issued. Therefore, a retrieval result can be reloaded without charge.

An accounting process 27 generates an accounting log file 28 and a fee display file 29 at a request from the output CGI 24. At this time, users are charged based on individual user IDs. The accounting process 27 can also be realized as, unlike in the present embodiment, a non-resident process activated by the output CGI 24, or with its process directly incorporated into the output CGI 24. However, the accounting process 27 exclusively controls a file to protect it from being cleared by overwriting it when an accounting log is generated. Since the exclusive control requires a large load, it is not suitable for incorporation into the CGI. If a single process (accounting process 27) is resident as in the present embodiment so that the accounting data is received from the output CGI 24 to the memory, then the data is transmitted from the output CGI 24 to the accounting process 27 at a higher speed, thereby improving the response of the entire process.

The fee display file 29 stores for each user ID a screen showing the utilization of services and charged amount for a past predetermined period. At a request from the browser, the data is transmitted through the httpd 21. The user can call-up the screen at any time. For example, the user can be informed of the accounting conditions for the part two weeks.

The file deletion batch 26 automatically deletes the retrieval result file 25 if a predetermined time has passed since the file was generated. This limits access to within a predetermined time for the charge-free repetitive access to a single retrieval result. After the predetermined time has passed, it is required to retrieve data again with a charge in another session.

The accounting method using the database retrieving system shown in FIG. 2 is described by referring to FIGS. 3 through 10.

Figure 3:
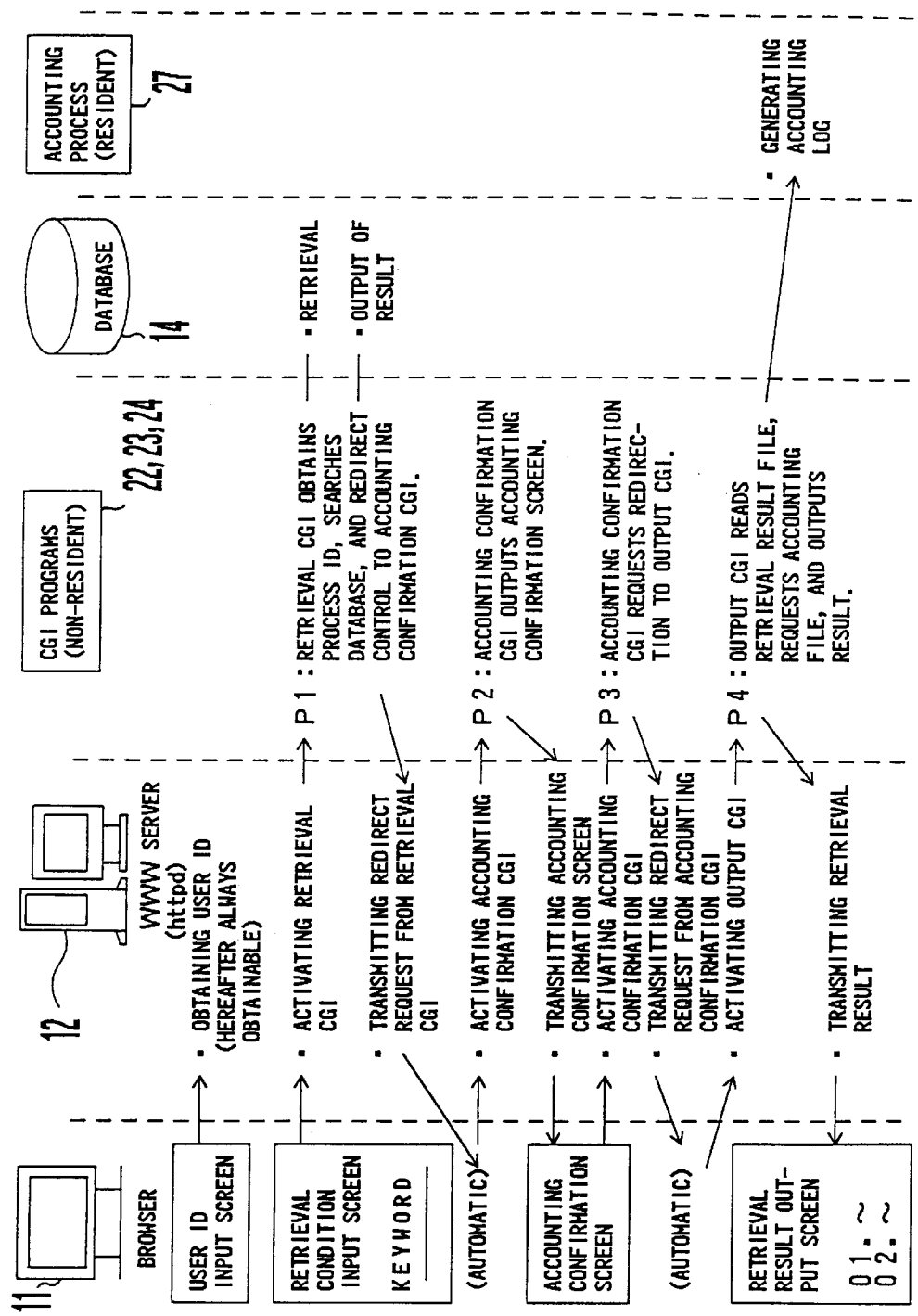
FIG. 3 shows the sequence of processes.
Figure 4:
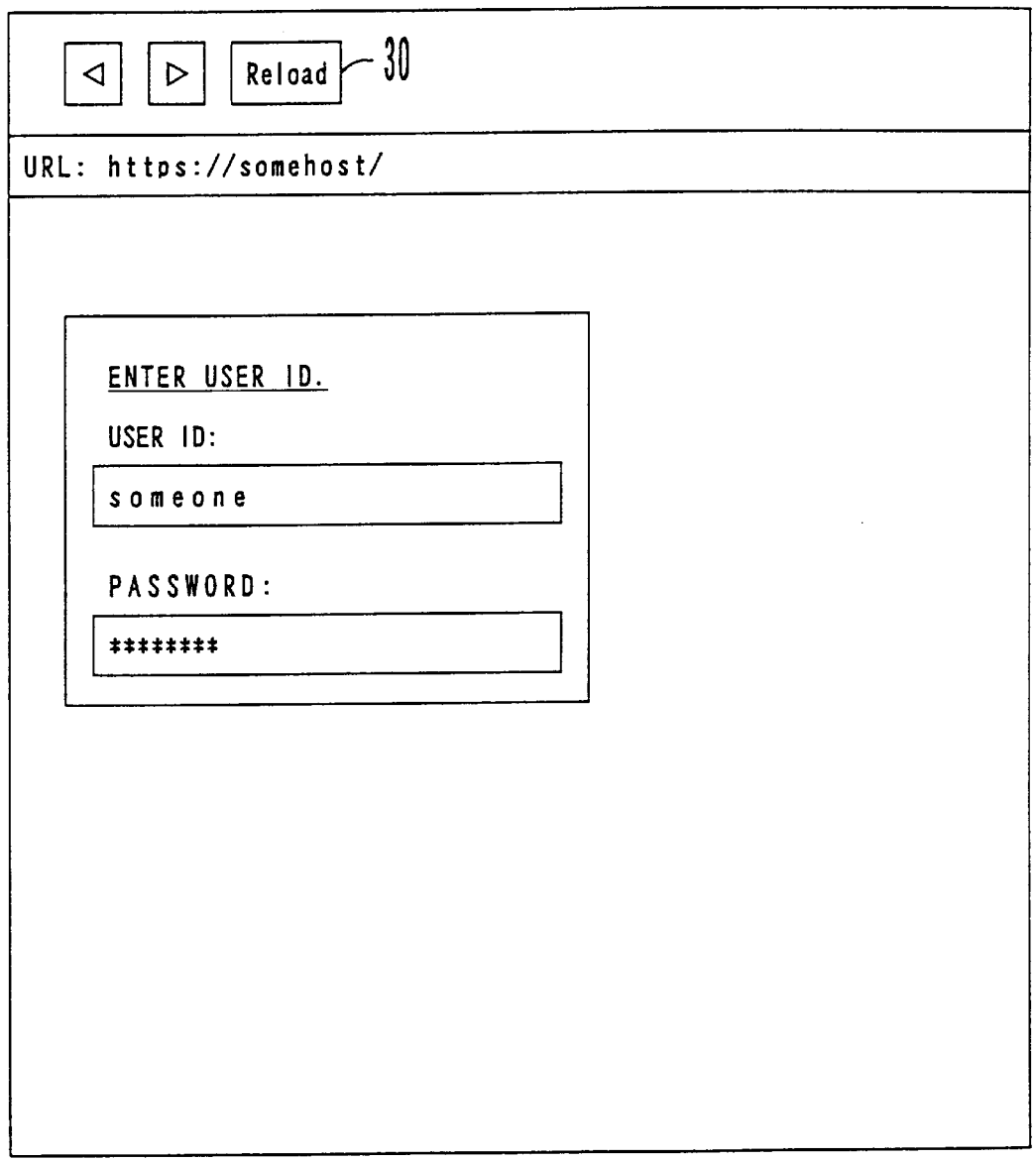
FIG. 4 shows the user ID input screen.

FIG. 3 shows the process sequence of the database retrieving system shown in FIG. 2. When the browser of the client 11 is activated as shown in FIG. 3, the user ID input screen is displayed as shown in FIG. 4. On the screen shown in FIG. 4, the URL to be accessed indicates the host computer name of the WWW server 12.

When the user inputs a user ID and a password as instructed on the screen, the httpd 21 of the WWW server 12 obtains the user ID. Afterwards, the user ID is automatically obtained each time the same user gains access through the basic authenticating function between the browser and the httpd 21.

When the user accesses the database retrieval service, the retrieval condition input screen is displayed as shown in FIG. 5. On the screen shown in FIG. 5 corresponding to the case where a company information database is selected, the keywords of a company name, a representative phone number, etc. and detailed conditions such as sequential matching, etc. can be entered. The URL displayed here indicates the URL on the retrieval condition input screen. When the cancel button 32 is selected, the input on this screen is canceled.

Figure 6:
FIG. 6 shows the name of a retrieval result file.

If a retrieval start button 31 is selected after the retrieval conditions are entered, the httpd 21 activates the retrieval CGI 22. In process P1, the retrieval CGI 22 obtains the process ID generated at the time of activation, and generates a retrieval result file name as shown in FIG. 6 using the process ID and user ID as session keys. The retrieval result file name shown in FIG. 6 has the user ID and process ID arranged adjacently.

The retrieval CGI 22 requests the database server 13 to search the database 14, receives the retrieval result, and writes it to the retrieval result file 25. Then, the retrieval CGI 22 redirects control to the accounting confirmation CGI 23.

The URL of the output CGI 24 is embedded in the URL of the accounting confirmation CGI 23 transmitted to the browser as redirect information to output CGI 24. The URL of the output CGI 24 includes a retrieval result file name, etc. The retrieval result file name is embedded in the URL of the output CGI 24, except for the user ID, as the information to be exchanged.

When the browser receives a redirect request from the retrieval CGI 22 through the httpd 21, it specifies the URL of the accounting confirmation CGI 23 and automatically accesses the WWW server 12. At this time, the redirect information is automatically returned to the WWW server 12.

When the accounting confirmation CGI 23 is activated by the httpd 21, the accounting confirmation CGI 23 outputs an accounting confirmation screen in process P2, and the httpd 21 transmits it with the redirect information to the browser. As a result, the screen as shown in FIG. 7 is displayed.

On the accounting confirmation screen shown in FIG. 7, the displayed URL of the accounting confirmation CGI 23 is partly omitted because of the large volume of information. The total information reads as follows.

"https://somehost/cgi-bin/chrgchk?scene=search&next= https%3a%2f%somehost%2fcgi%2dbin%2fdb_ out%3ffile*3d12 30%2elist%2ehtml%26cntr%3d100%26page&3d1%26chkmod%3dON &prev= https%3a%2f%2fsomehost%2fcgi%2dbin%2fdb_ top*3ft ype%3dNM%26kwrd%3d%25A2%25A3%25A2%25A3%25A2%25A3%26frnt%3dON&final t%3dON&dbid=DB"

Of the leading portion of the URL "https://somehost/cgi-bin/chrgchk", "https" indicates a protocol name, "somehost" indicates a host name, and "/cgi-bin/chrgchk" indicates a path name. "?" and subsequent characters indicate a request character string corresponding to the specified path.

The character string is delimited by "&" for each variable, and divided into the following variables. That is, the value "search" of the variable "scene" indicates the contents of the process of the accounting confirmation CGI 23. The value "https%3a %2f%somehost%2fcgi%2dbin%2fdb_ out%3ffile%3d1230%2e1 ist%2ehtml%26cntr%3d100%26page&3d1%26chkmod%3dON" of the variable "next" indicates the URL of the output CGI 24 to be accessed next. The value "https%3a%2f% 2fsomehost%2fcgi%2dbin%2fdb_ top%3ftype%3dNM%26kwrd% 3d%25A2%25A3%25A2%25A3%25A2%25A3%26frnt%3dON" of the variable "prev" indicates the URL of the previous screen.

The value "DB" of the variable "dbid" indicates the identifier of the database that specifies whether or not the user requests further confirmation of accounting. Of the variables, the value of "next" indicating the URL of the output CGI 24 is used as the information for redirecting control to the output CGI 24. The process ID "1230" is embedded in this variable as the information designating the retrieval result file name.

If a selection item 33 indicating "this screen continues to be output hereafter" is selected on this accounting confirmation screen, the flag corresponding to the URL of the output CGI 24 is set "ON" to display the accounting confirmation screen before performing an accounting process. If a selection item 34 indicating "this screen is not output any more" is selected, then the flag is set to "OFF" to stop displaying the accounting confirmation screen.

When a continue button 35 indicating that the user has accepted the accounting is selected, the browser designates the URL of the currently displayed accounting confirmation CGI 23 to access the WWW server 12, and the httpd 21 activates the accounting confirmation CGI 23 again. The accounting confirmation CGI 23 redirects control to the output CGI 24 in process P3 based on the redirect information transmitted from the browser.

Upon receipt of a redirect request from the accounting confirmation CGI 23 through the httpd 21, the browser specifies the URL of the output CGI 24 to automatically access the WWW server 12. At this time, the information about the name of the retrieval result file, etc. embedded in the URL is automatically returned to the WWW server 12.

When the output CGI 24 is activated by the httpd 21, in process P4, the output CGI 24 obtains a user ID, and generates a retrieval result file name by combining the obtained user ID with a process ID. Then, it reads the retrieval result file 25, converts the contents of the file into an HTML format, and transmits the converted data to the browser through the httpd 21.

If the retrieval result is accessed a first time, the accounting process 27 is requested to perform an accounting process. The accounting process 27 records an accounting log in the accounting log file 28.

When the browser receives the contents, the retrieval result output screen as shown in FIG. 8 is displayed. A list of company names including keywords entered as retrieval conditions is displayed on the screen shown in FIG. 8. The company names are linked to the CGI for retrieving the outlines of individual companies. Selecting a button on each company name displays the outline of that company.

In the URL displayed on the screen shown in FIG. 8, "/cgi-bin/db_out" corresponds to the path name of the output CGI 24, and "file=1230.list.html" indicates the partial information of the retrieval result file name. "1230" is a process ID first obtained by the retrieval CGI 22. Therefore, in this example, a file name such as "user ID.1230.list.html" is assigned to the retrieval result file 25.

If the mouse button is clicked on a specific company name on the screen shown in FIG. 8, then control is redirected to a corresponding retrieval CGI, and the outline of the company is retrieved according to the process sequence as shown in FIG. 3. As a result, a retrieval result output screen is displayed as shown in FIG. 9. On the screen shown in FIG. 9, the outline of the specified company, that is, phone number, address, foundation date, etc. is displayed as retrieval results.

In FIG. 3, process P1 of the retrieval CGI 22 is switched to process P2 of the accounting confirmation CGI 23 through the redirecting function between a server and a client. They also can be switched in the server without a client. Process P3 of the accounting confirmation CGI 23 can be similarly switched to process P4 of the output CGI 24.

The above described sequence refers to the case where data are transmitted without any problems. However, the data transmission may be suspended through a problem with the Internet. In such a case, the user instructs the browser to reload the data, and accesses again the URL accessed immediately before the suspension to have the data retransmitted.

Figure 10:
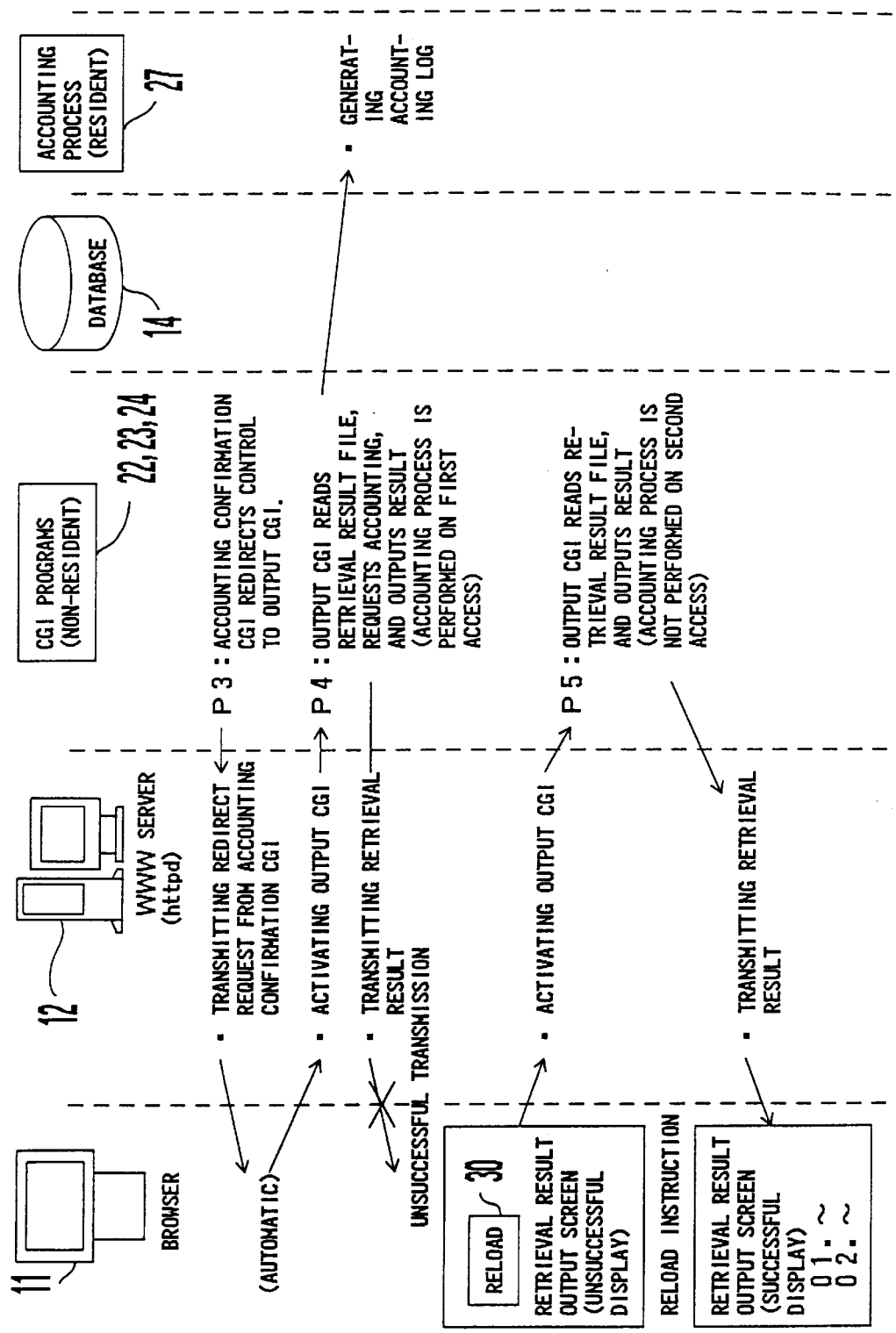
FIG. 10 shows the reloading process performed when data transmission fails.

FIG. 10 shows the reloading process performed when a retrieval result is transmitted in process P4 shown in FIG. 3, but does not reach the browser due to the network congestion, etc.

In FIG. 10, processes P3 and P4 are the same as those shown in FIG. 3. In this example, access is gained a first time to the retrieval result file, and an accounting log is generated by the accounting process 27. If the retrieval result cannot be successfully transmitted, the browser is kept in a retrieval result wait state without displaying any data on the screen, or in a state where the retrieval result is displayed halfway.

At this time, since the URL of the browser has been switched to the output CGI 24, the user selects the reload button 30 shown in FIG. 8 to transmit a reload request to the WWW server 12.

Then, the output CGI 24 is activated by the httpd 21. The output CGI 24 generates a retrieval result file name again, reads the retrieval result file 25, and outputs again the retrieval result in process P5. Thus, a complete retrieval result output screen is displayed on the display unit of the client 11 as shown in FIG. 8.

Since the accounting flag of the retrieval result file 25 indicates "charged" in process P5, the accounting process 27 is not instructed to perform an accounting process. The user can reload data for any number of times before the retrieval result file 25 is deleted without charge for the reloading operations. An instruction to reload data can be issued on the retrieval result output screen shown in FIG. 9.

Since the process ID specifying the file name of the retrieval result file 25 is exchanged as information to be exchanged in the accounting system according to the present embodiment, the browser can request retransmission of the retrieval result using the process ID. Furthermore, since the destination of the access by the browser is switched to the URL of the output CGI 24 through the redirecting function, the output CGI 24 can be directly activated without reactivating the retrieval CGI 22.

If the user selects the selection item 34 on the accounting confirmation screen shown in FIG. 7, then the accounting confirmation CGI 23 is not activated in the subsequent retrieval. In this case, the retrieval CGI 22 directly redirects control to the output CGI 24 in process P1, and the output CGI 24 performs process P4 according to the redirect information.

If data is not successfully transmitted, the user selects the reload button 30 shown in FIG. 8 as in the sequence shown in FIG. 10. At this time, since the URL of the output CGI 24 is stored by the client 11, the output CGI 24 is activated and the data can be retransmitted without charge.

Next, the process flow of each CGI is described by referring to FIGS. 11 through 14.

Figure 11:
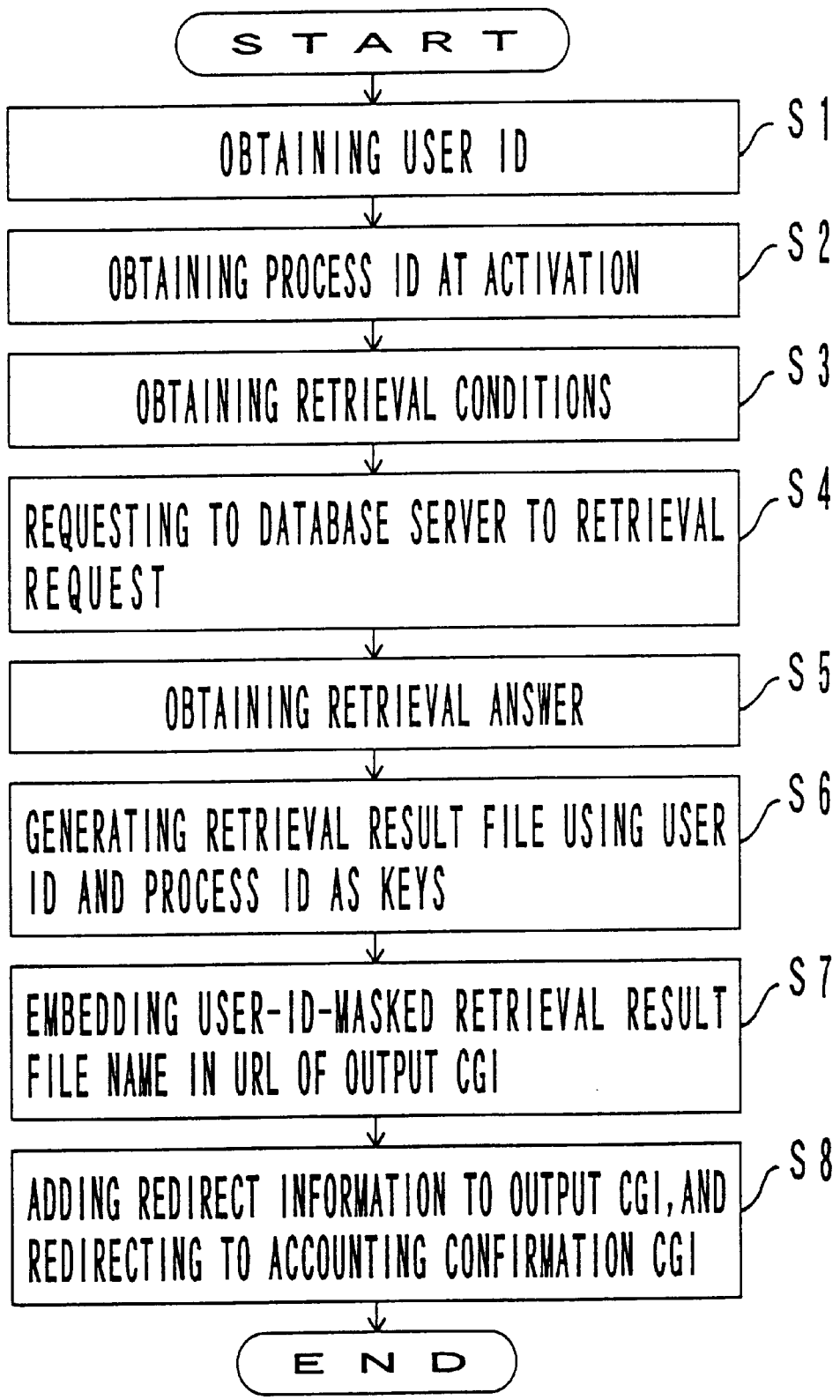
FIG. 11 is a flowchart showing the process performed by a retrieval CGI.

FIG. 11 is a flowchart showing the process performed by the retrieval CGI 22 corresponding to process P1 shown in FIG. 3. When the process starts as shown in FIG. 11, the retrieval CGI 22 first obtains a user ID (step S1), and obtains the process ID of the retrieval CGI 22 generated when it is activated (step S2).

Next, the retrieval conditions such as a keyword, etc. transmitted from the browser are obtained (step S3) and a request to the database server 13 to retrieve data is issued (step S4). Upon receipt of an answer in response to the retrieval request (step S5), the retrieval CGI 22 stores the retrieval result in the retrieval result file 25 and assigns a file name with the user ID and process ID used as session keys (step S6).

Then, it masks the user ID of the generated retrieval result file name, embeds it in the URL of the output CGI 24, and generates redirect information to the output CGI 24 (step S7). To mask the user ID, it is, for example, simply deleted from the retrieval result file name, and the redirect information is added, together with a database identifier, etc., to the redirect request to the accounting confirmation CGI 23 (step S8), thereby terminating the process.

If the option is selected not to output the accounting confirmation screen, redirect information is added to the redirect request to the output CGI 24 and then output in step S8.

Figure 12:
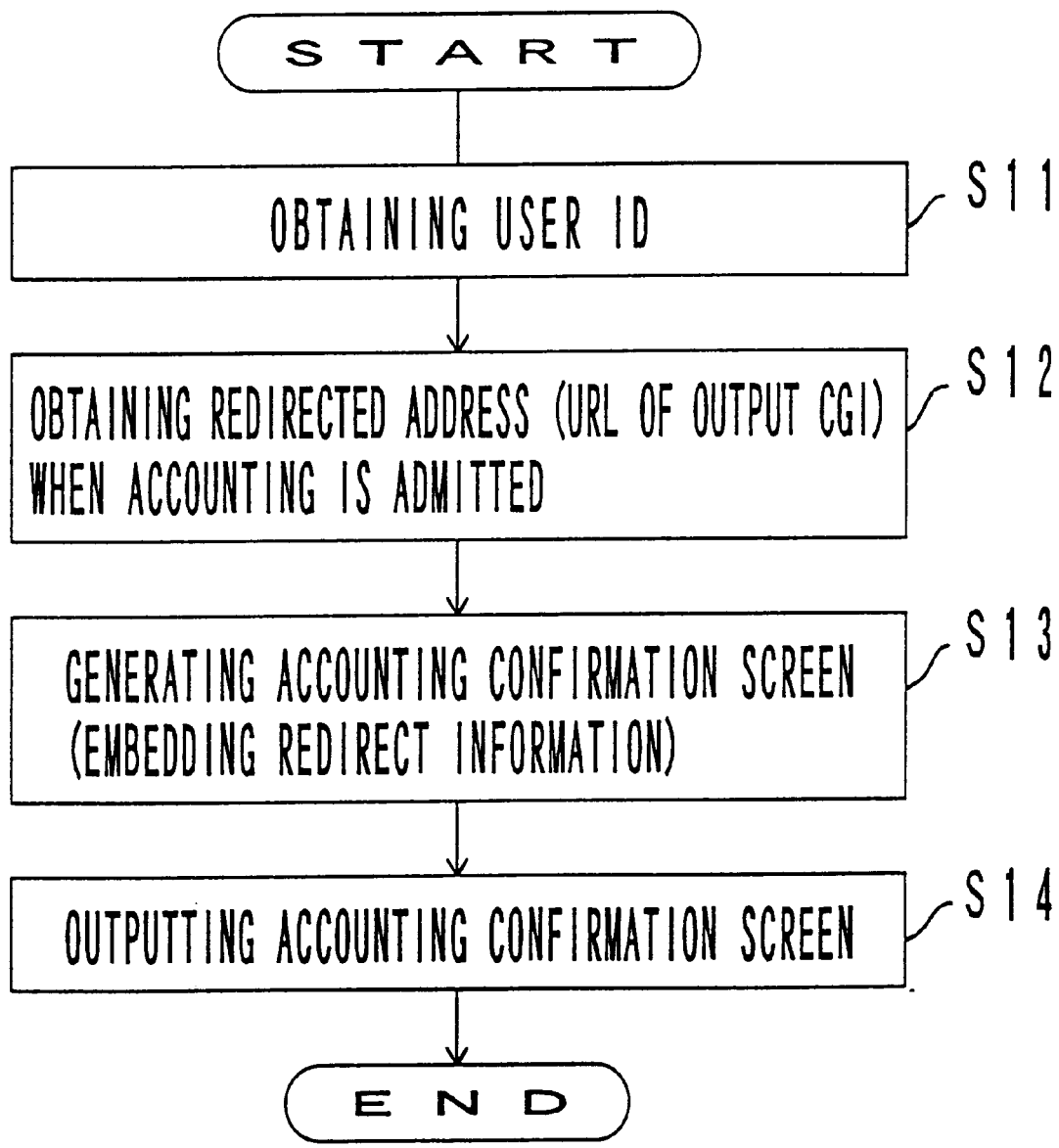
FIG. 12 is a flowchart showing the first process performed by the accounting confirmation CGI.

Then, FIG. 12 is a flowchart showing the process performed by the accounting confirmation CGI 23 corresponding to process P2 shown in FIG. 3. When the process starts as shown in FIG. 12, the accounting confirmation CGI 23 first obtains a user ID (step S11), and obtains redirect information transmitted from the browser (step S12). The redirect information contains the URL of the output CGI 24 redirected to when the accounting is admitted.

Next, the redirect information is embedded in the format of the accounting confirmation screen (step S13), and is then output (step S14), thereby terminating the process.

Figure 13:
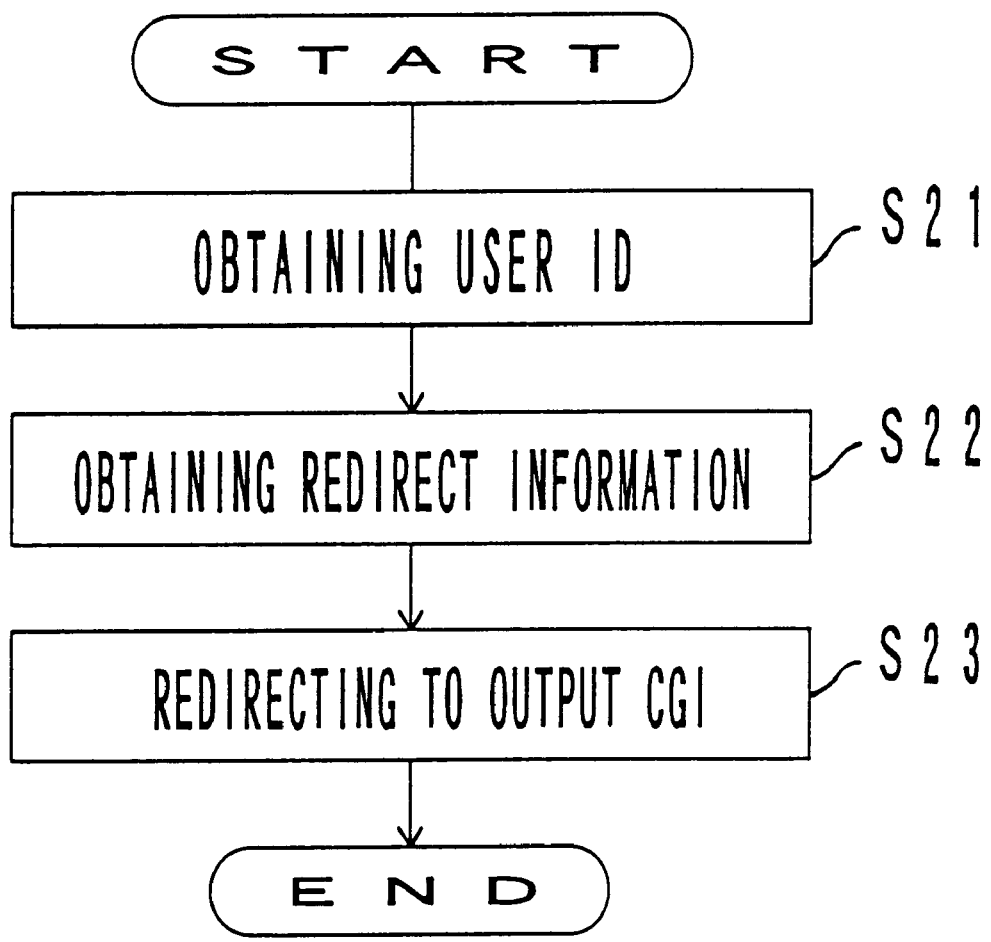
FIG. 13 is a flowchart showing the second process performed by the accounting confirmation CGI.

FIG. 13 is a flowchart showing the process performed by the accounting confirmation CGI 23 corresponding to process P3 performed when the accounting is admitted as shown in FIG. 3. When the process starts as shown in FIG. 13, the accounting confirmation CGI 23 first obtains a user ID (step S21), and obtains redirect information transmitted from the browser (step S22). According to this redirect information, it outputs a redirect request to the output CGI 24 (step S23), thereby terminating the process.

Figure 14:
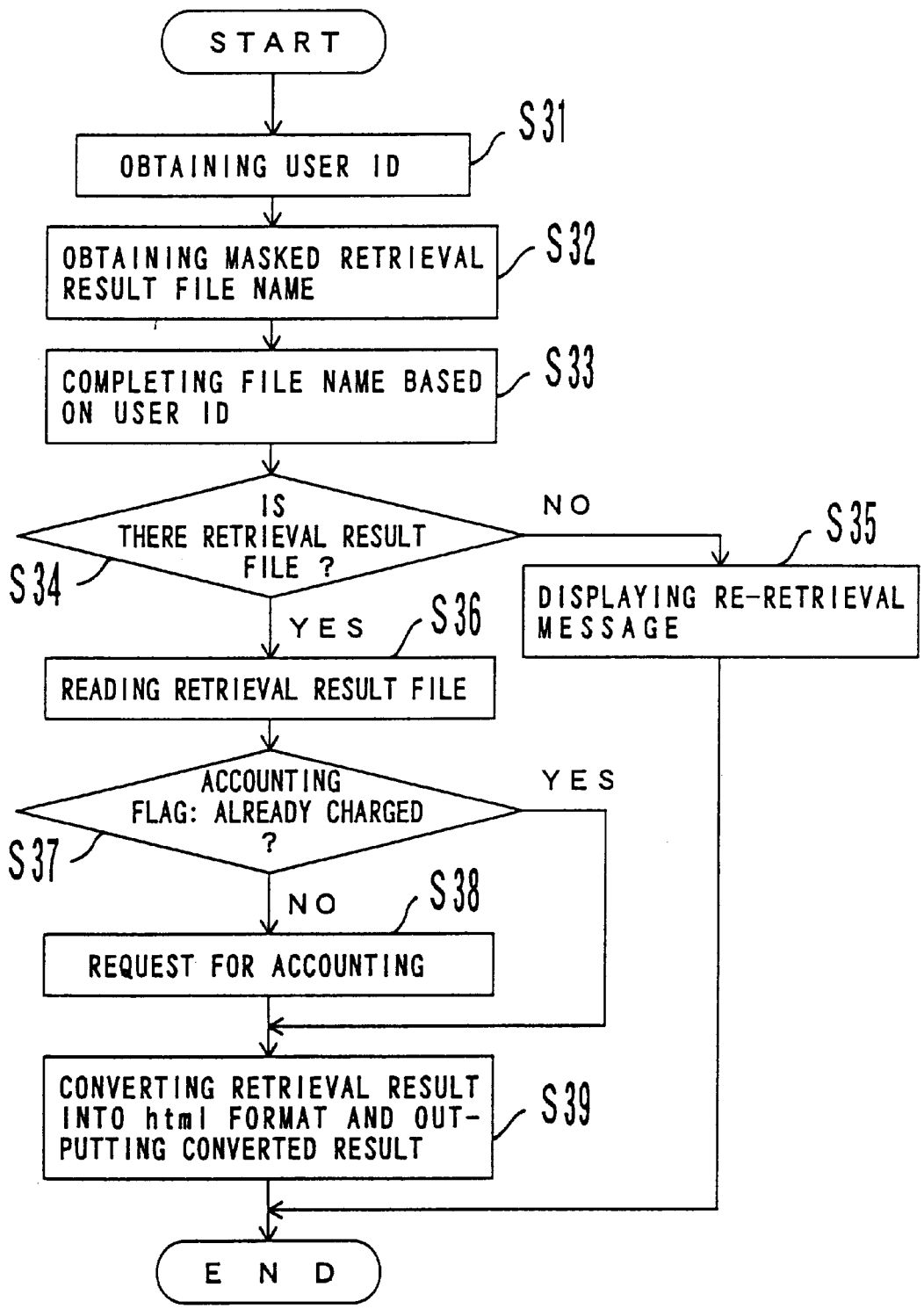
FIG. 14 is a flowchart showing the process performed by the output CGI.

FIG. 14 is a flowchart showing the process performed by the output CGI 24 corresponding to process P4 shown in FIG. 3. When the process starts as shown in FIG. 14, the output CGI 24 first obtains a user ID (step S31), and obtains the masked retrieval result file name from the information transmitted from the browser (step S32).

Next, the file name is completed based on the user ID (step S33), and the mask-released retrieval result file name is retrieved from the WWW server 12 (step S34). Unless the corresponding retrieval result file 25 is found, it is assumed that the file deletion batch 26 has deleted it, and a message requesting the user to re-retrieve the data to the browser is issued (step S35), thereby terminating the process.

If a corresponding retrieval result file 25 can be found, it is read (step S36) and the value of an accounting flag is referred to (step S37). If it indicates 'not charged', it is rewritten as 'charged' and the accounting process 27 is requested to perform an accounting process (step S38). Afterwards this session is recognized as 'charged' and double accounting is avoided if the data is reloaded. Next, the retrieval result of the retrieval result file 25 is converted into an HTML format and output (step S39), thereby terminating the process.

When the accounting flag indicates 'charged' in step S37, a retrieval result is output without a request for an accounting process (step S39), thereby terminating the process.

In the above described embodiment, a process ID is displayed on the screen of the browser as shown in FIGS. 8 and 9. Therefore, another user who knows the user ID can use it to obtain the contents of the retrieval result file 25 without charge. To avoid this, the retrieval CGI 22 may encrypt the process ID in step S7 shown in FIG. 11, or the redirect information can be generated with both user ID and process ID encrypted.

The file name of the retrieval result file 25 is not limited to the format shown in FIG. 6, but the result optionally obtained using the user ID and process ID can be used as a file name. Furthermore, the retrieval CGI 22 generates any identification information instead of the process ID to use it as information to be exchanged.

FIGS. 8 and 9 show the retrieval result of a company information database. The process sequence shown in FIG. 3 and 10 is similar to that in other optional database retrieval. Other databases include, for example, information in newspapers, news flashes, magazines, books, industrial-, economic-, and managerial-information, personal and common information, special information, international information, official information, and scientific and technological information, as well as foreign databases, etc.

The accounting system according to the present invention is not used only for the database retrieval service, but for all services provided through a WWW server, for example, computation services, translation services, sales of software contents, etc.

In these services, the CGI corresponding to the retrieval CGI 22 shown in FIG. 2 transfers a process request from a browser to a server or process which actually provides a service, and the information to be exchanged can be generated from the file name of a file storing the process result. Redirection based on the information to be exchanged transmits a process result in the process sequence similar to that shown in FIGS. 3 and 10, thereby performing an accounting process.

According to the present invention, the information relating to the file name of a file storing a process result is exchanged between a client and a server. Therefore, a session covering two screens can be managed even in a connectionless communications such as a WWW, etc., and the accounting process can be successfully performed for each session. Within a predetermined period, a user can reload data without charge, and a reasonable volume-dependent accounting system can be realized for both a service provider and a user.

What is claimed is:

1. An accounting system for use in an information processing system which provides a service through connectionless communications, comprising:

identification generating means for generating identification of a result area storing a process result data to be provided for a client based on a user identifier;

redirecting means for outputting identification information relating to the identification to the client, and allowing the client who uses the identification information to access data;

result area obtaining means for generating the identification from the identification information and user identifier received from the client, and obtaining accounting information from the result area; and account determining means for determining whether or not a user is to be charged according to the accounting information, and outputting a determination result.

2. The accounting system according to claim 1, further comprising:

accounting means for receiving the determination result from said account determining means, and charging the user for each user identifier according to the determination result.

3. The accounting system according to claim 1, wherein said account determining means determines that an accounting process is performed when the accounting information indicates 'not charged', and changes the accounting information of the result area into 'charged'.

4. The accounting system according to claim 1, wherein said account determining means determines that an accounting process is not performed when the accounting information indicates 'charged'.

5. The accounting system according to claim 1, wherein said identification generating means generates the identification using a process identifier obtained when the service is requested from the client; and said redirecting means outputs the identification information containing the process identifier to the client.

6. The accounting system according to claim 1, wherein said result area obtaining means recognizes, when the result area exists, access gained using the identification information as access in a session in which the identification has been generated and outputs contents of the result area to the client, and does not recognize the session when the result area does not exist.

7. The accounting system according to claim 1, wherein said redirecting means outputs information for use in accessing said result area obtaining means to the client together with the identification information.

8. The accounting system according to claim 1, further comprising:

accounting confirmation means for outputting to the client an accounting confirmation screen on which the user is requested to accept an accounting process when access is gained using the identification information.

9. The accounting system according to claim 8, wherein said accounting confirmation means outputs information for use in accessing said result area obtaining means to the client together with the accounting confirmation screen.

10. The accounting system according to claim 1, further comprising:

file deleting means for deleting the result area after a predetermined time, wherein said result area obtaining means outputs an appropriate message when the result area does not exist.

11. The accounting system according to claim 1, further comprising:

fee display means for, when said account determining means determines an accounting process, generating a fee display file storing data of a charged amount, and outputting contents of the fee display file in response to a request from the client.

12. The accounting system according to claim 1, further comprising:

retrieving means for storing a retrieval result in the result area after searching a database at a request from the client, wherein said result area obtaining means outputs the retrieval result to the client.

13. An accounting system for use in an information processing system which provides a service through connectionless communications, comprising:

session managing means for managing a session according to address information of a result file storing a process result, and recognizing two or more accessing processes performed using the address information from a client as a same session; and accounting means for charging a user for each session.

14. The accounting system according to claim 13, wherein said session managing means recognizes as access associated with the session a reload request issued using the address information and transmitted from the client in response to an instruction from the user to reload the result file; and said accounting means does not charge the user for the reload request.

15. The accounting system according to claim 13, wherein said session managing means recognizes a new service request as access associated with another session when the new service request which is similar to a previous service request is received from the user; and said accounting means charges the user for the new service request.

16. An accounting system for use in an information processing system which provides a service through connectionless communications, comprising:

process generating means for recognizing a session based on a process identifier, and generating a plurality of non-resident processes which share processes associated with the session; and accounting means for charging a user for each session.

17. A client system for use in an information processing system for receiving a service through connectionless communications, comprising:

accessing means for accessing a server using file name information after receiving a file name, generated based on a user identifier, of a result file storing accounting information for use in determining whether or not a user is to be charged and process result; and receiving means for receiving contents of the result file after the file name is generated by the server from the file name information and the user identifier and the result file is obtained.

18. An accounting system for use in an information processing system which provides a service through connectionless communications, comprising:

file name generating means for generating a file name of a result file storing a process result to be provided for a client based on a process identifier generated when service is requested from the client;

redirecting means for outputting file name information relating to the file name to the client, and allowing the client who uses the file name information to access data;

result file obtaining means for generating the file name from the file name information received from the client, and obtaining accounting information in the result file; and account determining means for determining whether or not a user is to be charged according to the accounting information, and outputting a determination result.

19. The accounting system according to claim 18, wherein said process identifier is generated according to information obtained from an operation system used in the information processing system.

20. The accounting system according to claim 18, further comprising:

output means for generating a file identifier, in response to an output request, from at least one of a process identifier received from the client together with the output request and an identifier based on the process identifier, and from a user identifier received when the output request is received, and for outputting a process result in the result file when a result file having the file name matching the file identifier exists.

21. The accounting system according to claim 18, wherein said connectionless communications are realized by a World Wide Web.

22. A computer-readable storage medium used to direct a computer for providing a service through connectionless communications to perform the functions of:

generating a file name of a result file storing a process result to be provided for a client based on a user identifier;

outputting file name information relating to the file name to the client, and allowing the client who uses the file name information to access data;

generating the file name from the file name information and user identifier received from the client, and obtaining accounting information from the result file; and determining whether or not a user is to be charged according to the accounting information, and outputting a determination result.

23. A method of providing a service through connectionless communications, comprising the steps of:

generating a file name of a result file storing a process result to be provided for a client based on a user identifier;

outputting file name information relating to the file name to the client, and allowing the client who uses the file name information to access data;

generating the file name from the file name information and user identifier received from the client, and obtaining accounting information from the result file; and determining whether or not a user is to be charged according to the accounting information.

24. A method of providing a service through connectionless communications, comprising the steps of:

managing a session according to address information of a result file storing a process result;

recognizing two or more accessing processes performed using the address information from a client as a same session; and charging a user for each session.

25. A method of providing a service through connectionless communications, comprising the steps of:

recognizing a session based on a process identifier, and generating a plurality of non-resident processes which share processes associated with the session; and charging a user for each session.

* * * * *